United States Patent
Sato et al.

(10) Patent No.: US 7,666,486 B2
(45) Date of Patent: Feb. 23, 2010

(54) MULTI-LAYERED BIAXIAL STRETCH BLOW MOLDED BOTTLE AND METHOD FOR PRODUCTION THEREOF

(75) Inventors: Takashi Sato, Ibaraki (JP); Hisanori Tobita, Ibaraki (JP); Daisuke Itoh, Ibaraki (JP); Norio Ozawa, Ibaraki (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 11/578,371

(22) PCT Filed: Apr. 15, 2005

(86) PCT No.: PCT/JP2005/007658
§ 371 (c)(1),
(2), (4) Date: Oct. 13, 2006

(87) PCT Pub. No.: WO2005/099996
PCT Pub. Date: Oct. 27, 2005

(65) Prior Publication Data
US 2007/0224375 A1    Sep. 27, 2007

(30) Foreign Application Priority Data
Apr. 16, 2004    (JP)    ............... 2004-122228

(51) Int. Cl.
*B32B 27/08*    (2006.01)
(52) U.S. Cl. ............... 428/36.7; 428/34.1; 428/35.7; 428/36.6
(58) Field of Classification Search .............. 428/34.1, 428/34.4, 34.6, 34.7, 35.7, 36.6, 36.92, 36.7
See application file for complete search history.

(56) References Cited

U.S. PATENT DOCUMENTS

| | | | |
|---|---|---|---|
| 4,398,642 A | 8/1983 | Okudaira et al. | |
| 4,959,421 A * | 9/1990 | Hirahara et al. | 525/437 |
| 6,117,538 A * | 9/2000 | Hirata et al. | 428/315.9 |
| 6,166,171 A * | 12/2000 | Yamamoto et al. | 528/310 |
| 2002/0098310 A1 | 7/2002 | Kikuchi et al. | |
| 2004/0076781 A1 | 4/2004 | Kanda et al. | |

FOREIGN PATENT DOCUMENTS

| | | |
|---|---|---|
| EP | 0 180 191 A1 | 10/1985 |
| JP | 2001-001476 | 6/1999 |
| JP | 2002-103428 | 9/2000 |
| JP | 2003-226322 | 3/2002 |
| JP | 2004-160935 | 11/2002 |
| JP | 2004-160987 | 10/2003 |

OTHER PUBLICATIONS

European Search Report for PCT/JP2005/007658 dated Dec. 3, 2007.
International Search Report.
"Handbook of Saturated Polyester Resins", issued by The Nikkan Kogyo Shinbun, Ltd., First Ed., Issue 1, Dec. 22, 1989, p. 627, Table 12.14.

* cited by examiner

*Primary Examiner*—Rena L Dye
*Assistant Examiner*—Walter B Aughenbaugh
(74) *Attorney, Agent, or Firm*—Reed Smith LLP; Nanda P. B. A. Kumar

(57) ABSTRACT

A multi-layer biaxially stretched blow bottle having a 3-layer structure of PET/nylon MXD6/PET or a 5-layer structure of PET/nylon MXD6/PET/nylon MXD6/PET, wherein the oxygen gas transmission coefficient of the nylon MXD6 layer is at most $6.0 \times 10^{-14}$ $cm^3 \cdot cm/cm^2 \cdot sec \cdot cmHg$ as measured under conditions of a temperature of 23° C. and a relative humidity of 80%, and a production process of the bottle by biaxial stretch blow molding at a low stretching temperature and high draw ratios.

8 Claims, No Drawings

MULTI-LAYERED BIAXIAL STRETCH BLOW MOLDED BOTTLE AND METHOD FOR PRODUCTION THEREOF

TECHNICAL FIELD

The present invention relates to a multi-layer biaxially stretched blow bottle having a 3-layer structure of polyethylene terephthalate/nylon MXD6/polyethylene terephthalate or a 5-layer structure of polyethylene terephthalate/nylon MXD6/polyethylene terephthalate/nylon MXD6/polyethylene terephthalate, in which the oxygen gas barrier property of the nylon MXD6 layer is markedly improved, and a production process thereof.

BACKGROUND ART

A PET bottle obtained by molding polyethylene terephthalate (hereinafter abbreviated as "PET") is excellent in not only physical properties such as strength, transparency and gloss, but also hygienic property and safety.

As processes for molding the PET bottle, are generally adopted a direct blow molding process and a stretch blow molding process. The direct blow molding process is a process in which a parison in a molten state is formed by means of an extruder or injection molding machine, and the parison is subjected to blow molding within a blow mold. Many of PET bottles are produced by the stretch blow molding process. According to the stretch blow molding process, a preform is formed by injection molding or extrusion, the temperature of the preform is controlled to a certain temperature, and the preform is then stretched in a machine direction by means of a stretching rod and in a transverse direction by means of high-pressure air within a blow mold to produce a biaxially stretched blow bottle.

Since PET is low in melt viscosity, the formation of the preform by extrusion involves a problem of drawdown. Therefore, there is generally adopted an injection stretch blow molding process in which a preform is formed from PET by injection molding, and the preform is subjected to stretch blow molding at a temperature not higher than the melting point of PET. This injection stretch blow molding includes a hot parison method that a preform obtained by injection molding is subjected to stretch blow molding in a hot state without completely cooling it, and a cold parison method that a parison obtained by injection molding is cooled to room temperature, and then reheated to a stretching temperature to conduct stretch blow molding.

The biaxially stretched blow bottle obtained by the stretch blow molding of PET is excellent in heat resistance, transparency, gloss, retention of perfume and the like and also relatively good in carbon dioxide gas barrier property and oxygen gas barrier property. However, the biaxially stretched blow bottle of PET is yet insufficient in carbon dioxide gas barrier property and oxygen gas barrier property as a container for alcoholic drinks such as rice wine and beer, carbonated drinks such as soda pop and cola, fruit drinks (including tea, coffee, sports drinks, etc., in addition to fruit juices), medicines, and the like, and thus is required to improve its gas barrier properties from the viewpoint of shelf life (change in taste of contents).

As a method for improving the gas barrier properties of the biaxially stretched blow bottle of PET, there has heretofore been proposed a multi-layer biaxially stretched blow bottle having a 3-layer structure of PET/gas barrier resin/PET or a 5-layer structure of PET/gas barrier resin/PET/gas barrier resin/PET with the gas barrier resin arranged as an intermediate layer, and such bottles have been already marketed. Typical examples of the gas barrier resin include an ethylene-vinyl alcohol copolymer (hereinafter abbreviated "EVOH") and nylon MXD6. A multi-layer biaxially stretched blow bottle having such a layer structure is generally produced by an injection stretch blow molding process in which PET and a gas barrier resin are co-injection-molded to mold a multi-layer preform, and the multi-layer preform is reheated to a stretching temperature to subject the preform to biaxial stretch blow molding.

Among these gas barrier resins, EVOH is excellent in gas barrier properties under a low humidity, but absorbs moisture under a high humidity to lower its gas barrier properties. Therefore, a multi-layer biaxially stretched blow bottle having an EVOH layer is not suitable for use as a packaging material for water-containing foods and retortable foods.

On the other hand, nylon MXD6 contains no chlorine atom in its molecule but is not very changed in gas barrier properties even under a high humidity. Also, Nylon MXD6 almost consists with PET in injection molding temperature and stretch blow molding temperature, and thus is excellent in co-injection moldability with PET, and so biaxial stretch blow molding can be smoothly performed.

However, nylon MXD6 has a demerit that its gas barrier properties are considerably low compared with other gas barrier resins. In order to sufficiently elongate the shelf life of contents containing carbon dioxide gas or easy to be denatured by oxidation, such as an alcoholic drink, carbonated drink or medicine, nylon MXD6 has had a limit.

Bottles with an oxygen absorbent such as a cobalt salt contained in a nylon MXD6 layer for the purpose of enhancing the gas barrier properties of a multi-layer biaxially stretched blow bottle having a 3-layer structure of PET/nylon MXD6/PET or a 5-layer structure of PET/nylon MXD6/PET/nylon MXD6/PET have heretofore been produced and sold as bottles for beer. However, the inclusion of an inorganic filler such as the cobalt salt in a great amount in nylon MXD6 had possibilities that difficulty would be encountered upon smoothly performing biaxial stretch blow molding, conditions for stretch blow molding would be limited, and the transparency of the resulting bottle would be impaired.

In a biaxially stretched blow bottle composed of 3 layers of PET/barrier resin/PET, has been proposed a gas barrier biaxially stretched blow bottle using, as a barrier resin of an intermediate layer, a gas barrier resin containing a silicate composite obtained by an ion-exchange reaction with a positively charged organic compound in a proportion of 0.1 to 10% by weight (Japanese Patent Application Laid-Open No. 2001-1476, hereinafter referred to as "Reference 1"). This Reference 1 discloses EVOH and nylon MXD6 as gas barrier resins.

When the silicate composite is contained in nylon MXD6 of the intermediate layer, a multi-layer biaxially stretched blow bottle low in oxygen transmission rate can be obtained. However, the method of adding the silicate composite has a possibility that the stretch blow moldability and transparency of the resulting bottle may be adversely affected, in addition to increase in cost. In fact, Reference 1 describes the fact that the preparation of the silicate composite requires to strictly control the amount of a positively charged organic compound ion introduced into a silicate of a lamellar crystal within a fixed range, and no uniform silicate composite may be obtained, or the dispersibility of the resulting silicate composite in the gas barrier resin is deteriorated when the amount introduced is outside the predetermined range.

By the way, when a multi-layer biaxially stretched blow container having a 3-layer structure of PET/nylon MXD6/

PET or a 5-layer structure of PET/nylon MXD6/PET/nylon MXD6/PET is produced, stretching conditions such as draw ratio and stretching temperature have been generally caused to consist with the stretching conditions for PET bottles. When a preform of PET is used to produce a biaxially stretched blow bottle, it has been generally common that a draw ratio (stretch ratio) in a machine direction (axial direction) is controlled within a range of about 1.5 times to about 2.0 times, and a draw ratio in a transverse direction (circumferential direction) is controlled within a range of about 4.0 times to about 4.6 times. When the draw ratio in the transverse direction is made high within the above-described respective ranges while retaining an area ratio to about 9 times or lower, the draw ratio in the machine direction has been made low (Handbook of Saturated Polyester Resins, issued by THE NIKKAN KOGYO SHINBUN, LTD., the first issue of the first edition on Dec. 22, 1989, p. 627, Table 12.14).

As to the stretching temperature, in general, a temperature not lower than the glass transition temperature of PET, but not higher than the melting point thereof is widely adopted. However, in fact, the stretching temperature of a preform is often controlled as high as about 95° C. to about 100° C. for the purpose of enhancing orientation crystallizability of PET and preventing whitening of the resulting bottle.

Therefore, the multi-layer biaxially stretched blow bottle having the 3-layer structure of PET/nylon MXD6/PET or the 5-layer structure of PET/nylon MXD6/PET/nylon MXD6/PET has also been generally produced under the above-described stretching conditions.

For example, Examples 1 to 4 of Reference 1 disclose experimental examples where a gas barrier resin with a silicate complex contained in a proportion of 2 to 4% by weight in nylon MXD6 was used produce a biaxially stretched blow bottle having a 3-layer structure of PET/gas barrier resin/PET. According to these examples, it is understood that a multi-layer preform (weight: 29 g, height: 110 mm, diameter: 25 mm) formed by injection molding is reheated to a stretching temperature of 100° C., and the preform is subjected to biaxial stretch blow molding under molding conditions that a draw ratio in a machine direction is of the order of 1.8 to 1.9 times (height of bottle: 200 mm), and a draw ratio in a transverse direction is of the order of a little under 4 times (volume of bottle: 500 ml). Comparative Example 1 of Reference 1 shows that nylon MXD6 containing no silicate complex was used to produce a multi-layer biaxially stretched blow bottle having a 3-layer structure of PET/nylon MXD6/PET under the same stretching conditions as described above.

According to an investigated result by the present inventors, however, it has been found again that when neither a silicate complex nor an inorganic filler for improving oxygen gas barrier property, such as a cobalt salt is added, it is difficult to produce a multi-layer biaxially stretched blow bottle sufficiently improved in oxygen gas barrier property by adopting such conventional stretching conditions.

DISCLOSURE OF THE INVENTION

It is an object of the present invention to provide a multi-layer biaxially stretched blow bottle having a 3-layer structure of PET/nylon MXD6/PET or a 5-layer structure of PET/nylon MXD6/PET/nylon MXD6/PET, in which the oxygen gas barrier property of the nylon MXD6 layer is markedly improved without containing a great amount of an additive such as an inorganic filler for improving the oxygen gas barrier property.

The present inventors have carried out an extensive investigation with a view toward overcoming the above-described problems. As a result, it has been found that a multi-layer preform formed by co-injection molding and having a 3-layer structure of PET/nylon MXD6/PET or a 5-layer structure of PET/nylon MXD6/PET/nylon MXD6/PET is subjected to biaxial stretch blow molding under stretch blow molding conditions composed of a combination of a relatively low stretching temperature and a relatively high draw ratio, whereby the oxygen gas barrier property of the nylon MXD6 layer can be markedly improved.

Specifically, a multi-layer preform formed by co-injection molding and having a 3-layer structure of PET/nylon MXD6/PET or a 5-layer structure of PET/nylon MXD6/PET/nylon MXD6/PET is subjected to biaxial stretch blow molding at an extremely limited low stretching temperature of 86 to 94° C., preferably 87 to 93° C. and high draw ratios that a draw ratio in a machine direction is at least 2.10 times, and a draw ratio in a transverse direction is at least 4.65 times, thereby obtaining a multi-layer biaxially stretched blow bottle, in which the oxygen gas transmission coefficient of the nylon MXD6 layer is $6.0 \times 10^{-14}$ cm$^3$·cm/cm$^2$·sec·cmHg or lower, preferably $5.5 \times 10^{-14}$ cm$^3$·cm/cm$^2$·sec·cmHg or lower as measured under conditions of a temperature of 23° C. and a relative humidity of 80%.

When the above-described multi-layer preform is molded into a multi-layer biaxially stretched blow bottle under the conventional typical stretch blow molding conditions disclosed in Reference 1 or the like, for example, under stretch blow molding conditions of a stretching temperature of 100° C., a draw ratio of 1.9 times in a machine direction and a draw ratio of 4.5 times in a transverse direction, the oxygen gas transmission coefficient of the nylon MXD6 layer only amounts to about $9.0 \times 10^{-14}$ cm$^3$·cm/cm$^2$·sec·cmHg as measured under conditions of a temperature of 23° C. and a relative humidity of 80%. From this fact, the effect to improve the gas barrier property of the nylon MXD6 layer by the present invention is surprising.

It has also been found that in the case of a biaxially stretched film composed of a single layer of nylon MXD6, no biaxially stretched film having an oxygen gas transmission coefficient of $6.0 \times 10^{-14}$ cm$^3$·cm/cm$^2$·sec·cmHg or lower can be obtained even when the stretching temperature and draw ratios are variously changed. Accordingly, such an effect to improve the gas barrier property of the nylon MXD6 layer as described above by the multi-layer biaxial stretch blow molding under the specified conditions is extremely characteristic. The present invention has been led to completion on the basis of these findings.

According to the present invention, there is thus provided a multi-layer biaxially stretched blow bottle having a 3-layer structure of polyethylene terephthalate/nylon MXD6/polyethylene terephthalate or a 5-layer structure of polyethylene terephthalate/nylon MXD6/polyethylene terephthalate/nylon MXD6/polyethylene terephthalate, wherein the oxygen gas transmission coefficient of the nylon MXD6 layer is at most $6.0 \times 10^{-14}$ cm$^3$·cm/cm$^2$·sec·cmHg as measured under conditions of a temperature of 23° C. and a relative humidity of 80%.

According to the present invention, there is also provided a process for producing a multi-layer biaxially stretched blow bottle, which comprises co-injection-molding polyethylene terephthalate and nylon MXD6 to mold a multi-layer preform having a 3-layer structure of polyethylene terephthalate/nylon MXD6/polyethylene terephthalate or a 5-layer structure of polyethylene terephthalate/nylon MXD6/polyethylene terephthalate/nylon MXD6/polyethylene terephthalate and then subjecting the multi-layer preform to biaxial stretch blow molding at a stretching temperature of 86 to 94° C., a draw ratio of at least 2.10 times in a machine direction and a draw ratio of at least 4.65 times in a transverse direction to obtain a multi-layer biaxially stretched blow bottle in which the oxygen gas transmission coefficient of the nylon MXD6 layer is at most $6.0 \times 10^{-14}$ cm$^3$·cm/cm$^2$·sec·cmHg as measured under conditions of a temperature of 23° C. and a relative humidity of 80%.

BEST MODE FOR CARRYING OUT THE INVENTION

Polyethylene terephthalate (PET) is synthesized with the formation of water by a polycondensation reaction of terephthalic acid and ethylene glycol (direct polymerization process). PET may also be synthesized by transesterification reaction of dimethyl terephthalate and ethylene glycol (transesterification process). PET obtained by solid-state polymerization is preferred in that PET high in molecular weight and little in coloring can be easily provided.

In the present invention, PET generally used for bottles may be used as PET. A copolymer of PET with cyclohexanedimethanol (Chd M) or the like is also suitably used. The melting point of PET is generally from 250° C. to 255° C. The melting point of PET can be controlled to a desired value by adjusting the content of a comonomer such as diethylene glycol. The IV value of PET for bottles is generally 0.7 to 1.0.

Nylon MXD6 is a crystalline polyamide obtained by polycondensation of m-xylylenediamine and adipic acid and also called polyamide MXD6. Nylon MXD6 has a chemical structure with an aromatic ring in its main chain and is excellent in gas barrier properties such as oxygen gas barrier property and carbon dioxide gas barrier property compared with other nylons.

Commercially available nylon MXD6 includes those of glass fiber-reinforced type or glass-mineral-reinforced type. However, that of an unreinforced grade is used in the present invention. Typical properties of nylon MXD6 of the unreinforced grade are as follows: specific gravity (ASTM D792)=1.21; water absorption (ASTM D570) at a relative humidity of 65%=3.00%; heat distortion temperature under a load of 1.82 Mpa (ASTM D648)=93° C. However, the present invention is not limited to that having these properties. Nylon MXD6 has a melting point of 243° C. and is generally observed having a glass transition temperature at 75° C. by DSC analysis. The nylon MXD6 used in the present invention preferably substantially contains neither a silicate complex nor an inorganic filler for improving oxygen gas barrier property, such as a cobalt salt. It is preferred from the viewpoints of stretch blow moldability and transparency that the nylon MXD6 substantially contains no additive.

In order to produce a multi-layer biaxially stretched blow bottle having a 3-layer structure of PET/nylon MXD6/PET or a 5-layer structure of PET/nylon MXD6/PET/nylon MXD6/PET, a container-like multi-layer preform having such a layer structure is first formed by injection molding. The multi-layer preform is formed by subjecting PET and nylon MXD6 to co-injection molding by means of a multi-layer injection molding machine at, for example, a cylinder temperature of 255 to 285° C. and a mold temperature of 35 to 45° C.

Proportions of PET and nylon MXD6 used in the multi-layer preform are generally 85 to 98% by weight, preferably 88 to 95% by weight for PET and generally 2 to 15% by weight, preferably 5 to 12% by weight for nylon MXD6. Since the biaxial stretch blow molding is conducted at high draw ratios in the present invention, the multi-layer preform is preferably in a short and thick-wall form. The form of the multi-layer preform may be designed on the basis of the shape, thickness and the like of the intended multi-layer biaxially stretched blow bottle. The multi-layer preform may be provided with a part, which will become a mouth part (threaded part, cap-fitting part or the like) of the bottle, in accordance with a method known per se in the art. The multi-layer preform is generally cooled to ordinary temperature.

In order to conduct the stretch blow molding by a cold parison method, the multi-layer preform is reheated to a stretching temperature. Examples of systems for heating the multi-layer preform include systems such as a (near) infrared heater, a metal pipe-covered heater, a quartz heater and induction heating. However, it is desirable to adopt a system capable of uniformly heating the multi-layer preform in its thickness-wise direction and machine direction. The multi-layer preform may also be passed through a heating zone of a stretch blow molding machine to reheat it.

In the present invention, the stretching temperature is precisely controlled within a range of 86 to 94° C., preferably 87 to 93° C. The measurement of the stretching temperature is performed by measuring the temperature of the multi-layer preform by means of an infrared sensor or the like right after the reheating. If the stretching temperature is too low, the biaxial stretch blow molding may become difficult, or the body part of the resulting bottle is easy to whiten. If the stretching temperature is too high, the gas barrier property of the nylon MXD6 layer cannot be improved even when the draw ratios are made high.

The multi-layer preform reached the stretching temperature is subjected to multi-layer stretch blow molding by means of a stretch blow molding machine. The multi-layer preform is introduced into a blow mold of the stretch blow molding machine to stretch it in a machine direction (axial direction) by means of a stretching rod and in a transverse direction (circumferential direction) by blowing high-pressure air within the blow mold. In general, the stretching rod is put into to start the stretching in the machine direction, and the high-pressure air is blown at a proper period of time.

In the present invention, the draw ratio in the machine direction is controlled to at least 2.10 times, and the draw ratio in the transverse direction is controlled to at least 4.65 times. The draw ratio in the machine direction is preferably 2.15 to 3.30 times, more preferably 2.20 to 3.00 times. The draw ratio in the transverse direction is preferably 4.70 to 5.50 times, more preferably 4.80 to 5.20 times. If these draw ratios are too low, the oxygen gas barrier property of the nylon MXD6 layer cannot be improved. If these draw ratios are too high, it is difficult to form a short and thick-wall multi-layer preform. As a result, it is difficult to conduct the stretch blow molding itself.

Since orientation in the machine direction is advanced to make the stretching in the transverse direction difficult when the draw ratio in the machine direction is raised to excess, there has heretofore been a tendency for the draw ratio in the machine direction to be suppressed in the molding of a biaxially stretched blow bottle. In the present invention, the draw ratio in the machine direction has been able to be raised together with that in the transverse direction by controlling the stretching temperature within the extremely limited range.

The draw ratio in the machine direction means a ratio (BL/Pl) of a length (BL) of a bottle under its mouth part to a length (PL) of the multi-layer preform under its mouth part. The draw ratio in the transverse direction means a ratio (BD/PD) of an inner diameter (BD) of a bottle body to an inner diameter (PD) of the multi-layer preform.

In the present invention, the stretch blow molding is conducted at a relatively low stretching temperature and high draw ratios in both machine and transverse directions, whereby a multi-layer biaxially stretched blow bottle, in which the oxygen gas transmission coefficient of the nylon MXD6 layer is $6.0\times10^{-14}$ cm$^3$·cm/cm$^2$·sec·cmHg or lower, preferably $5.5\times10^{-14}$ cm$^3$·cm/cm$^2$·sec·cmHg or lower, more preferably $5.3\times10^{-14}$ cm$^3$·cm/cm$^2$·sec·cmHg or lower as measured under conditions of a temperature of 23° C. and a relative humidity of 80%, can be obtained. The lower limit value of the oxygen gas transmission coefficient of the nylon MXD6 layer is of the order of generally $4.5\times10^{-14}$ cm$^3$·cm/cm$^2$·sec·cmHg, often $4.8\times10^{-14}$ cm$^3$·cm/cm$^2$·sec·cmHg.

In order to measure the oxygen gas transmission coefficient of the nylon MXD6 layer in the multi-layer biaxially stretched blow bottle, a specimen is cut out of the body part of the bottle, and the PET Layers are removed from the specimen to take out a singly layer of the nylon MXD6. An oxygen transmission rate of this nylon MXD6 layer is measured under conditions of a temperature of 23° C. and a relative humidity of 80%. A thickness of the nylon MXD6 layer is also measured. The oxygen gas transmission coefficient is calculated out from these measured values.

No particular limitation is imposed on the shape and size of the multi-layer biaxially stretched blow bottle according to the present invention. The bottle may be provided as a bottle having, for example, the same shape and size as those of PET bottles or the like circulating in the market. The layer structure of the multi-layer biaxially stretched blow bottle according to the present invention is a 3-layer structure of PET/nylon MXD6/PET or a 5-layer structure of PET/nylon MXD6/PET/nylon MXD6/PET. However, that of the 3-layer structure of PET/nylon MXD6/PET can exhibit fully satisfactory performance in many application fields. The PET layers also include a PET layer of a recycled layer with about 10% by weight of a ground product of PET bottles (single-layer bottles of PET) mixed therein. Further, the PET layer arranged as a core layer of the 5-layer structure may be a recycled layer composed of, for example, a ground product of the bottles of the 5-layer structure.

The thickness (overall thickness) of the body part of the multi-layer biaxially stretched blow bottle according to the present invention is generally 200 to 400 μm, preferably 230 to 350 μm. The total thickness of the PET layers in the body part is generally 190 to 350 μm, preferably 200 to 300 μm. The thickness (the total thickness in the case where 2 layers are present) of the nylon MXD6 layer in the body part is generally 10 to 80 μm, preferably 30 to 60 μm.

Since the oxygen gas barrier property of the nylon MXD6 layer in the multi-layer biaxially stretched blow bottle according to the present invention is markedly improved, it is suitable for use as a container for alcoholic drinks such as beer, carbonated drinks, fruit drinks, medicines, cosmetics and the like of which high oxygen gas barrier property and carbon dioxide gas barrier property are required. In addition, since nylon MXD6 is used as a gas barrier resin in the multi-layer biaxially stretched blow bottle according to the present invention, its gas barrier properties are scarcely deteriorated even under a high-humidity environment, so that it is also suitable for use as a container for water-containing foods and retortable foods.

Since the multi-layer biaxially stretched blow bottle according to the present invention has excellent gas barrier properties, it is suitable for use as a small-volume bottle having an internal volume of at most 710 ml, particularly 280 to 550 ml, which is great in surface area per volume. In general, the multi-layer preform becomes small as the volume of the resulting bottle is small, so that the stretch blow molding becomes difficult. However, the present invention can surprisingly sufficiently meet the molding of such a small-volume bottle.

EXAMPLES

The present invention will hereinafter be described more specifically by the following Examples and Comparative Examples. The measuring methods of an oxygen gas transmission coefficient and a stretching temperature are as follows.

(1) Oxygen Gas Transmission Coefficient:

An oxygen gas transmission rate of a nylon MXD6 layer (film) was measured under conditions of a temperature of 23° C. and a relative humidity of 80% by means of OX-TRAN2/20 manufacture by Modern Control Co., and an oxygen gas transmission coefficient thereof was determined from the measured value and a thickness of the film.

(2) Stretching Temperature:

A temperature of a preform was measured by means of a thermometer of an infrared sensor system right after the preform was passed through a reheating zone of a stretch blow molding machine.

Example 1

A multi-layer preform having a weight of 28 g, an overall length of 110 mm, a length under a mouth part of 89.1 mm (length of the mouth part of 20.9 mm), an outer diameter of 22 mm and an inner diameter of 14.7 mm was formed by using nylon MXD6 (trade name "Reny 6007", product of Mitsubishi Engineering-Plastics Corporation) as an intermediate layer (8% by weight) and polyethylene terephthalate (trade name "EASTAPAK 9921w", product of Eastman Chemical Co.) as inner and outer layers, controlling the injection temperature of the inner and outer layers to 280° C., the injection temperature of the intermediate layer to 270° C. and the temperature of a mold to 5° C. by means of a multi-layer injection molding machine (IN90 manufactured by Kortec Co.).

This multi-layer preform was stretched at a draw ratio of 2.30 times (length of a bottle under its mouth part/length of the preform under its mouth part) in a machine direction by means of a stretching rod and a draw ratio of 4.90 times (inner diameter of a bottle body/inner diameter of the preform) in a transverse direction with compressed air under conditions of a molding cycle of 950 BPH (bottles per hour; reheating time: about 70 seconds) and a reheating temperature (stretching temperature) of the multi-layer preform of 88° C. using a stretch blow molding machine, SBO-2 manufactured by Sidel Co., thereby molding a multi-layer biaxially stretched blow bottle.

The multi-layer biaxially stretched blow bottle obtained in such a manner had an internal volume of 710 ml, a length under a mouth part of 207 mm, an outer diameter of a body part of 72.9 mm and a thickness of the body part of 250 μm. The thicknesses of the respective layers in the body part are 100 μm for the PET layer, 50 μm for the nylon MXD6 layer and 100 μm for the PET layer. A specimen (about 100 mm×about 100 mm) was cut out of the body part of this bottle, and the inner and outer PET layers were removed from the specimen to take out only the nylon MXD6 layer. The oxygen transmission rate and thickness of the nylon MXD6 layer were measured to calculate out its oxygen gas transmission coefficient (the same shall apply to other Examples and Comparative Examples). The result is shown in Table 1.

Example 2

A multi-layer preform having a weight of 28 g, an overall length of 110 mm, a length under a mouth part of 89.1 mm (length of the mouth part of 20.9 mm), an outer diameter of 22 mm and an inner diameter of 14.7 mm was formed in the same manner as in Example 1. Stretch blow molding was performed in the same manner as in Example 1 except that this multi-layer preform was used, another blow mold than that used in Example 1 was employed, and the draw ratio in the machine direction was changed from 2.30 times to 2.80 times, thereby producing a multi-layer biaxially stretched blow bottle. The multi-layer biaxially stretched blow bottle obtained in such a manner had a length under a mouth part of 249 mm and an outer diameter of a body part of 72.9 mm. The result is shown in Table 1.

Example 3

A multi-layer preform was formed in the same manner as in Example 1. Stretch blow molding was performed in the same manner as in Example 1 except that this multi-layer preform was used, and the reheating temperature (stretching temperature) was changed from 88° C. to 92° C., thereby producing a multi-layer biaxially stretched blow bottle. The result is shown in Table 1.

Example 4

A multi-layer preform was formed in the same manner as in Example 2. Stretch blow molding was performed in the same manner as in Example 2 except that this multi-layer preform was used, and the reheating temperature (stretching temperature) was changed from 88° C. to 92° C., thereby producing a multi-layer biaxially stretched blow bottle. The result is shown in Table 1.

Comparative Example 1

A multi-layer preform was formed in the same manner as in Example 1. Stretch blow molding was performed in the same manner as in Example 1 except that this multi-layer preform was used, another blow mold than that used in Example 1 was employed, the reheating temperature (stretching temperature) was changed from 88° C. to 100° C., and the draw ratio in the machine direction and draw ratio in the transverse direction were changed from 2.30 times to 1.90 times and from 4.90 times to 4.50 times, respectively, thereby producing a multi-layer biaxially stretched blow bottle. The multi-layer biaxially stretched blow bottle obtained in such a manner had a length under a mouth part of 169 mm and an outer diameter of a body part of 66.2 mm. The result is shown in Table 1.

Comparative Example 2

A multi-layer preform was formed in the same manner as in Example 1. Stretch blow molding was performed in the same manner as in Example 1 except that this multi-layer preform was used, and the reheating temperature (stretching temperature) was changed from 88° C. to 100° C., thereby producing a multi-layer biaxially stretched blow bottle. The result is shown in Table 1.

Comparative Example 3

A multi-layer preform was formed in the same manner as in Example 2. Stretch blow molding was performed in the same manner as in Example 2 except that this multi-layer preform was used, and the reheating temperature (stretching temperature) was changed from 92° C. to 100° C., thereby producing a multi-layer biaxially stretched blow bottle. The result is shown in Table 1.

Comparative Example 4

A multi-layer preform was formed in the same manner as in Example 1. Stretch blow molding was performed in the same manner as in Example 1 except that this multi-layer preform was used, another blow mold than that used in Example 1 was employed, the reheating temperature (stretching temperature) was changed from 88° C. to 97° C., and the draw ratio in the machine direction and draw ratio in the transverse direction were changed from 2.30 times to 1.90 times and from 4.90 times to 4.50 times, respectively, thereby producing a multi-layer biaxially stretched blow bottle. The multi-layer biaxially stretched blow bottle obtained in such a manner had a length under a mouth part of 169 mm and an outer diameter of a body part of 66.2 mm. The result is shown in Table 1.

Comparative Example 5

A multi-layer preform was formed in the same manner as in Example 1. Stretch blow molding was performed in the same manner as in Example 1 except that this multi-layer preform was used, and the reheating temperature (stretching temperature) was changed from 88° C. to 97° C., thereby producing a multi-layer biaxially stretched blow bottle. The multi-layer biaxially stretched blow bottle obtained in such a manner had an internal volume of 710 ml, a length under a mouth part of 207 mm and an outer diameter of a body part of 72.9 mm. The result is shown in Table 1.

Comparative Example 6

Stretch blow molding was performed in the same manner as in Example 3 except that another blow mold than that used in Example 1 was employed, and the draw ratio in the machine direction and draw ratio in the transverse direction were changed from 2.30 times to 1.90 times and from 4.90 times to 4.50 times, respectively, thereby producing a multi-layer biaxially stretched blow bottle. The multi-layer biaxially stretched blow bottle obtained in such a manner had an internal volume of 710 ml, a length under a mouth part of 169 mm and an outer diameter of a body part of 66.2 mm. The result is shown in Table 1.

Comparative Example 7

Stretch blow molding was performed in the same manner as in Example 3 except that another blow mold than that used in Example 3 was employed, and the draw ratio in the transverse direction was changed from 4.90 times to 4.50 times, thereby producing a multi-layer biaxially stretched blow bottle. The multi-layer biaxially stretched blow bottle obtained in such a manner had a length under a mouth part of 207 mm and an outer diameter of a body part of 66.2 mm. The result is shown in Table 1.

Comparative Example 8

Stretch blow molding was performed in the same manner as in Example 1 except that the reheating temperature (stretching temperature) was changed from 88° C. in Example 1 to 84° C., thereby producing a multi-layer biaxially stretched blow bottle. The multi-layer biaxially stretched blow bottle obtained in such a manner had a length under a mouth part of 207 mm and an outer diameter of a body part of 72.9 mm. The result is shown in Table 1.

TABLE 1

(Multi-layer biaxial stretch blow molding)

| | Stretching temperature | Draw ratio | | Oxygen gas transmission coefficient of nylon MXD6 |
|---|---|---|---|---|
| | (° C.) | MD | TD | layer ($cm^3 \cdot cm/cm^2 \cdot sec \cdot cmHg$) |
| Ex. 1 | 88 | 2.30 | 4.90 | $5.3 \times 10^{-14}$ |
| Ex. 2 | 88 | 2.80 | 4.90 | $5.2 \times 10^{-14}$ |
| Ex. 3 | 92 | 2.30 | 4.90 | $5.2 \times 10^{-14}$ |
| Ex. 4 | 92 | 2.80 | 4.90 | $5.1 \times 10^{-14}$ |
| Comp. Ex. 1 | 100 | 1.90 | 4.50 | $9.3 \times 10^{-14}$ |
| Comp. Ex. 2 | 100 | 2.30 | 4.90 | $9.1 \times 10^{-14}$ |
| Comp. Ex. 3 | 100 | 2.80 | 4.90 | $8.6 \times 10^{-14}$ |
| Comp. Ex. 4 | 97 | 1.90 | 4.50 | $9.0 \times 10^{-14}$ |
| Comp. Ex. 5 | 97 | 2.30 | 4.90 | $8.4 \times 10^{-14}$ |
| Comp. Ex. 6 | 92 | 1.90 | 4.50 | $8.4 \times 10^{-14}$ |
| Comp. Ex. 7 | 92 | 2.30 | 4.00 | $8.3 \times 10^{-14}$ |
| Comp. Ex. 8 | 84 | 2.30 | 4.90 | Body wall was somewhat whitened |

As apparent from the results shown in Table 1, the oxygen gas transmission coefficient of the nylon MXD6 layer is $9.3 \times 10^{-14}$ $cm^3 \cdot cm/cm^2 \cdot sec \cdot cmHg$ when the same conditions as the ordinary biaxial stretch blow molding conditions are adopted (Comparative Example 1). When the stretching temperature is within the ordinary high range (Comparative Examples 2 to 5), the oxygen gas transmission coefficient of the nylon MXD6 layer cannot be greatly improved even when the draw ratios in the machine and transverse directions are variously changed.

When the draw ratio(s) in the machine direction and/or the transverse direction is lower than the range prescribed in the present invention (Comparative Examples 6 and 7), the oxygen gas transmission coefficient of the nylon MXD6 layer cannot be greatly improved even when the stretching temperature is made low. When the stretching temperature is too low (Comparative Example 8), PET layer of the body part of the bottle becomes whitened.

On the other hand, when the stretching temperature is controlled within a limited low temperature range, and the draw ratios in both machine and transverse directions are made high to produce a multi-layer biaxially stretched blow bottle (Examples 1 to 4), the oxygen gas transmission coefficient of the nylon MXD6 layer can be lowered to $5.5 \times 10^{-14}$ $cm^3 \cdot cm/cm^2 \cdot sec \cdot cmHg$ or lower.

Comparative Example 9

Nylon MXD6 (trade name "Reny 6007", product of Mitsubishi Engineering-Plastics Corporation) was extruded from a T-die at a cylinder temperature of 280° C. by means of an extruder (PEX40-24H Model, manufactured by PLA GIKEN Co., Ltd.) to form an unstretched sheet having a thickness of 280 μm. The oxygen gas transmission coefficient of this unstretched sheet was measured. The result is shown in Table 2.

Comparative Example 10

An unstretched sheet of the nylon MXD6 having a thickness of 280 μm was formed in the same manner as in Comparative Example 9. This unstretched sheet was biaxially stretched at a draw ratio of 2.50 times in a machine direction (MD) and a draw ratio of 4.50 times in a transverse direction (TD) at a stretching rate of 7 m/min and a stretching temperature of 92° C. by means of a biaxially stretching machine manufactured by Toyo Seiki Seisakusho, Ltd. to produce a biaxially stretched film composed of a single nylon MXD6 layer. The measured result of an oxygen gas transmission coefficient is shown in Table 2.

Comparative Examples 11 to 18

Biaxially stretched films composed of a single nylon MXD6 layer were produced in the same manner as in Comparative Example 10 except that the stretching temperature and draw ratios were changed as shown in Table 2. The measured results as to the oxygen gas transmission coefficients of these biaxially stretched films are shown in Table 2.

TABLE 2

(Biaxially stretched films of MXD6)

| | Stretching temperature | Draw ratio | | Oxygen gas transmission coefficient of nylon MXD6 |
|---|---|---|---|---|
| | (° C.) | MD | TD | layer ($cm^3 \cdot cm/cm^2 \cdot sec \cdot cmHg$) |
| Comp. Ex. 9 | Unstretched | — | — | $23.0 \times 10^{-14}$ |
| Comp. Ex. 10 | 92 | 2.50 | 4.50 | $8.4 \times 10^{-14}$ |
| Comp. Ex. 11 | 92 | 3.00 | 3.00 | $7.3 \times 10^{-14}$ |
| Comp. Ex. 12 | 92 | 2.30 | 4.90 | $8.5 \times 10^{-14}$ |
| Comp. Ex. 13 | 100 | 3.00 | 3.00 | $7.6 \times 10^{-14}$ |
| Comp. Ex. 14 | 100 | 4.00 | 4.00 | $6.8 \times 10^{-14}$ |
| Comp. Ex. 15 | 100 | 4.50 | 4.50 | $7.8 \times 10^{-14}$ |
| Comp. Ex. 16 | 120 | 3.00 | 3.00 | $11.0 \times 10^{-14}$ |
| Comp. Ex. 17 | 120 | 4.00 | 4.00 | $8.9 \times 10^{-14}$ |
| Comp. Ex. 18 | 120 | 4.50 | 4.50 | $7.2 \times 10^{-14}$ |

As apparent from the results shown in Table 2, the unstretched sheet (Comparative Example 9) of the nylon MXD6 is high in oxygen gas transmission rate and thus insufficient in gas barrier properties. When the unstretched sheet of the nylon MXD6 is biaxially stretched singly (Comparative Examples 10 to 18), the oxygen gas transmission coefficient can be lowered. However, it cannot be lowered to $6.0 \times 10^{-4}$ $cm^3 \cdot cm/cm^2 \cdot sec \cdot cmHg$ or lower.

The reason why the oxygen gas barrier property cannot be sufficiently improved compared with the case where the multi-layer biaxial stretch blow molding is conducted (Examples 1 to 4) when the unstretched sheet of the nylon MXD6 is biaxially stretched singly (Comparative Examples 10 to 18) is not always wholly clarified at the present stage. It is however considered that scission and microstructural breaking of a molecular chain are easy to occur according to a stretching method making use of a biaxially stretching machine by which transmission of stress is conducted through the molecular chain, whereas stress is applied directly to a molecular of the nylon MXD6 according to the multi-layer biaxial stretch blow molding, and so a uniform structure is easy to be formed, and consequently the gas barrier properties are markedly improved.

INDUSTRIAL APPLICABILITY

According to the present invention, there can be provided multi-layer biaxially stretched blow bottles having a 3-layer structure of PET/nylon MXD6/PET or a 5-layer structure of PET/nylon MXD6/PET/nylon MXD6/PET, in which the oxygen gas barrier property of the nylon MXD6 layer is markedly improved without containing an additive such as an inorganic filler for improving the oxygen gas barrier property in the nylon MXD6 layer.

According to the present invention, nylon MXD6 substantially containing no additive such as an inorganic filler can be used, so that multi-layer biaxially stretched blow bottles excellent in transparency, gloss, heat resistance, strength and the like and markedly improved in oxygen gas barrier property can be provided without impairing smooth practice of the biaxial stretch blow molding.

The multi-layer biaxially stretched blow bottles according to the present invention can be used as containers for alcoholic drinks such as rice wine and beer, carbonated drinks such as soda pop and cola, fruit drinks (including tea, coffee, sports drinks, etc., in addition to fruit juices), medicines, and the like making good use of their properties such as excellent gas barrier properties, transparency, heat resistance and glossiness. In addition, since the gas barrier properties of the multi-layer biaxially stretched blow bottles according to the present invention are scarcely deteriorated even under a high-humidity environment, they can be suitably utilized as packaging containers for water-containing foods and retortable foods.

The invention claimed is:

1. A multi-layer biaxially stretched blow molded bottle having a 3-layer structure of polyethylene terephthalate/nylon MXD6/polyethylene terephthalate or a 5-layer structure of polyethylene terephthalate/nylon MXD6/polyethylene terephthalate/nylon MXD6/polyethylene terephthalate, wherein the multi-layer biaxially stretched blow molded bottle is obtained by subjecting a multi-layer preform to biaxial stretch blow molding at a stretching temperature of 86-94° C., a draw ratio in a machine direction of 2.15-3.30 times by means of a stretching rod, and a draw ratio in a transverse direction of 4.70-5.50 times by blowing high-pressure air within a blow mold, and wherein the oxygen gas transmission coefficient of the nylon MXD6 layer is at most $6.0\times10^{-14}$ cm$^3$·cm/cm$^2$·sec·cmHg as measured under conditions of a temperature of 23° C. and a relative humidity of 80%.

2. The multi-layer biaxially stretched blow molded bottle according to claim 1, wherein the oxygen gas transmission coefficient of the nylon MXD6 layer is at most $5.5\times10^{-14}$ cm$^3$·cm/cm$^2$·sec·cmHg as measured under conditions of a temperature of 230° C. and a relative humidity of 80%.

3. The multi-layer biaxially stretched blow molded bottle according to claim 1, wherein the oxygen gas transmission coefficient of the nylon MXD6 layer is at most $5.3\times10^{-14}$ cm$^3$·cm/cm$^2$·sec·cmHg as measured under conditions of a temperature of 23° C. and a relative humidity of 80%.

4. The multi-layer biaxially stretched blow molded bottle according to claim 1, wherein a draw ratio in a machine direction is 2.20 to 3.00 times, and a draw ratio in a transverse direction is 4.80 to 5.20 times.

5. The multi-layer biaxially stretched blow molded bottle according to claim 1, wherein the nylon MXD6 layer is a layer composed of nylon MXD6 containing no inorganic filler.

6. The multi-layer biaxially stretched blow molded bottle according to claim 1, wherein the overall thickness of a body part of the bottle is 200 to 400 μm, the total thickness of the polyethylene terephthalate layers is 190 to 350 μm, and the total thickness of the nylon MXD6 layer(s) is 10 to 80 μm.

7. The multi-layer biaxially stretched blow molded bottle according to claim 1, wherein said stretching temperature is 87 to 93° C.

8. A multi-layer biaxially stretched blow molded bottle having a 3-layer structure of polyethylene terephthalate/nylon MXD6/polyethylene terephthalate or a 5-layer structure of polyethylene terephthalate/nylon MXD6/polyethylene terephthalate/nylon MXD6/polyethylene terephthalate, wherein the multi-layer biaxially stretched blow molded bottle is obtained by subjecting a multi-layer preform to biaxial stretch blow molding at a stretching temperature of 87-93° C., a draw ratio in a machine direction of 2.20-3.00 times by means of a stretching rod, and a draw ratio in a transverse direction of 4.80-5.20 times by blowing high-pressure air within the blow mold, and wherein the oxygen gas transmission coefficient of the nylon MXD6 layer is at most 6.0×10-14 cm3·cm/cm2·sec·cmHg measured under conditions of a temperature of 23° C. and a relative humidity of 80%.

* * * * *